US011088998B2

(12) United States Patent
Guendert et al.

(10) Patent No.: US 11,088,998 B2
(45) Date of Patent: Aug. 10, 2021

(54) ENCRYPTED FIBRE CHANNEL OVER INTERNET PROTOCOL DATA REPLICATION

(71) Applicant: International Business Machines Corporation, Armonk, NY (US)

(72) Inventors: Stephen Robert Guendert, Poughkeepsie, NY (US); Pasquale A. Catalano, Wallkill, NY (US); Patricia G. Driever, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 372 days.

(21) Appl. No.: 16/237,778

(22) Filed: Jan. 2, 2019

(65) Prior Publication Data

US 2020/0213282 A1  Jul. 2, 2020

(51) Int. Cl.

| *H04L 29/06* | (2006.01) |
|---|---|
| *G06F 16/27* | (2019.01) |
| *H04B 10/25* | (2013.01) |
| *H04L 12/46* | (2006.01) |
| *G06F 21/60* | (2013.01) |
| *H04L 12/28* | (2006.01) |

(52) U.S. Cl.
CPC .......... *H04L 63/0428* (2013.01); *G06F 16/27* (2019.01); *G06F 21/602* (2013.01); *H04B 10/25* (2013.01); *H04L 12/4633* (2013.01); *H04L 12/28* (2013.01)

(58) Field of Classification Search
CPC . H04L 63/0428; H04L 12/4633; H04L 12/28; G06F 16/27; G06F 21/602; H04B 10/25
See application file for complete search history.

(56) References Cited

U.S. PATENT DOCUMENTS

| 7,631,096 | B1 * | 12/2009 | Yeh ........................ H04L 12/413 370/231 |
|---|---|---|---|
| 7,721,063 | B2 | 5/2010 | Ontko |
| 9,331,920 | B2 * | 5/2016 | Nedeltchev ......... H04L 63/0272 |
| 10,757,138 | B2 * | 8/2020 | Qian ..................... H04L 63/102 |
| 2002/0044553 | A1 | 4/2002 | Chakravorty |
| 2002/0071438 | A1 | 6/2002 | Singh |
| 2006/0029062 | A1 | 2/2006 | Rao et al. |
| 2007/0061529 | A1 * | 3/2007 | Eastman ............. G06F 11/2087 711/162 |
| 2010/0121972 | A1 | 5/2010 | Samuels et al. |

(Continued)

*Primary Examiner* — Arvin Eskandarnia
(74) *Attorney, Agent, or Firm* — Cantor Colburn LLP; Steven Chiu

(57) ABSTRACT

Examples of techniques for encrypted fibre channel over internet protocol (FCIP) data replication are described herein. An aspect includes receiving replication data from a primary site host system, the replication data comprising header information. Another aspect includes encrypting the replication data. Another aspect includes writing the header information to a local memory, wherein the header information in the local memory is unencrypted. Yet another aspect includes encapsulating the encrypted replication data, wherein the unencrypted header information is accessed in the local memory during the encapsulation of the encrypted replication data.

17 Claims, 6 Drawing Sheets

(56) References Cited

U.S. PATENT DOCUMENTS

| | | | |
|---|---|---|---|
| 2012/0185433 A1* | 7/2012 | Harris, Jr. | G06F 11/2066 |
| | | | 707/623 |
| 2017/0359855 A1* | 12/2017 | Jiao | H04W 72/0433 |
| 2020/0119911 A1* | 4/2020 | Shemer | H04L 9/0894 |
| 2020/0213282 A1* | 7/2020 | Guendert | H04B 10/25 |

* cited by examiner

US 11,088,998 B2

ENCRYPTED FIBRE CHANNEL OVER INTERNET PROTOCOL DATA REPLICATION

BACKGROUND

The present techniques relate to computer storage networks. More specifically, the techniques relate to encrypted fibre channel over internet protocol (FCIP) data replication for computer storage networks.

An organization may generate and store a relatively large amount of data, for example, sales or customer data. Multiple copies of an organization's data may be mirrored at different physical sites, so as to ensure that the data is not lost in the event of a failure at one of the storage sites. The data may be replicated across storage sites by transmitting the data over a network (e.g., a fiber network) from a primary site to one or more secondary sites. The network may connect storage sites that are relatively far apart geographically.

SUMMARY

According to an embodiment described herein, a system can include logic to receive replication data from a primary site host system, the replication data comprising header information. The logic can also encrypt the replication data. The logic can also write the header information to a local memory, wherein the header information in the local memory is unencrypted. The logic can also encapsulate the encrypted replication data, wherein the unencrypted header information is accessed in the local memory during the encapsulation of the encrypted replication data.

According to another embodiment described herein, a method can include receiving replication data from a primary site host system, the replication data comprising header information. The method can also include encrypting the replication data. The method can also include writing the header information to a local memory, wherein the header information in the local memory is unencrypted. The method can also include encapsulating the encrypted replication data, wherein the unencrypted header information is accessed in the local memory during the encapsulation of the encrypted replication data.

According to another embodiment described herein, an apparatus can include hardware logic to receive replication data from a primary site host system, the replication data comprising header information. The apparatus can also include hardware logic to encrypt the replication data. The apparatus can also include hardware logic to write the header information to a local memory, wherein the header information in the local memory is unencrypted. The apparatus can also include hardware logic to encapsulate the encrypted replication data, wherein the unencrypted header information is accessed in the local memory during the encapsulation of the encrypted replication data.

DETAILED DESCRIPTION

Figure 1:
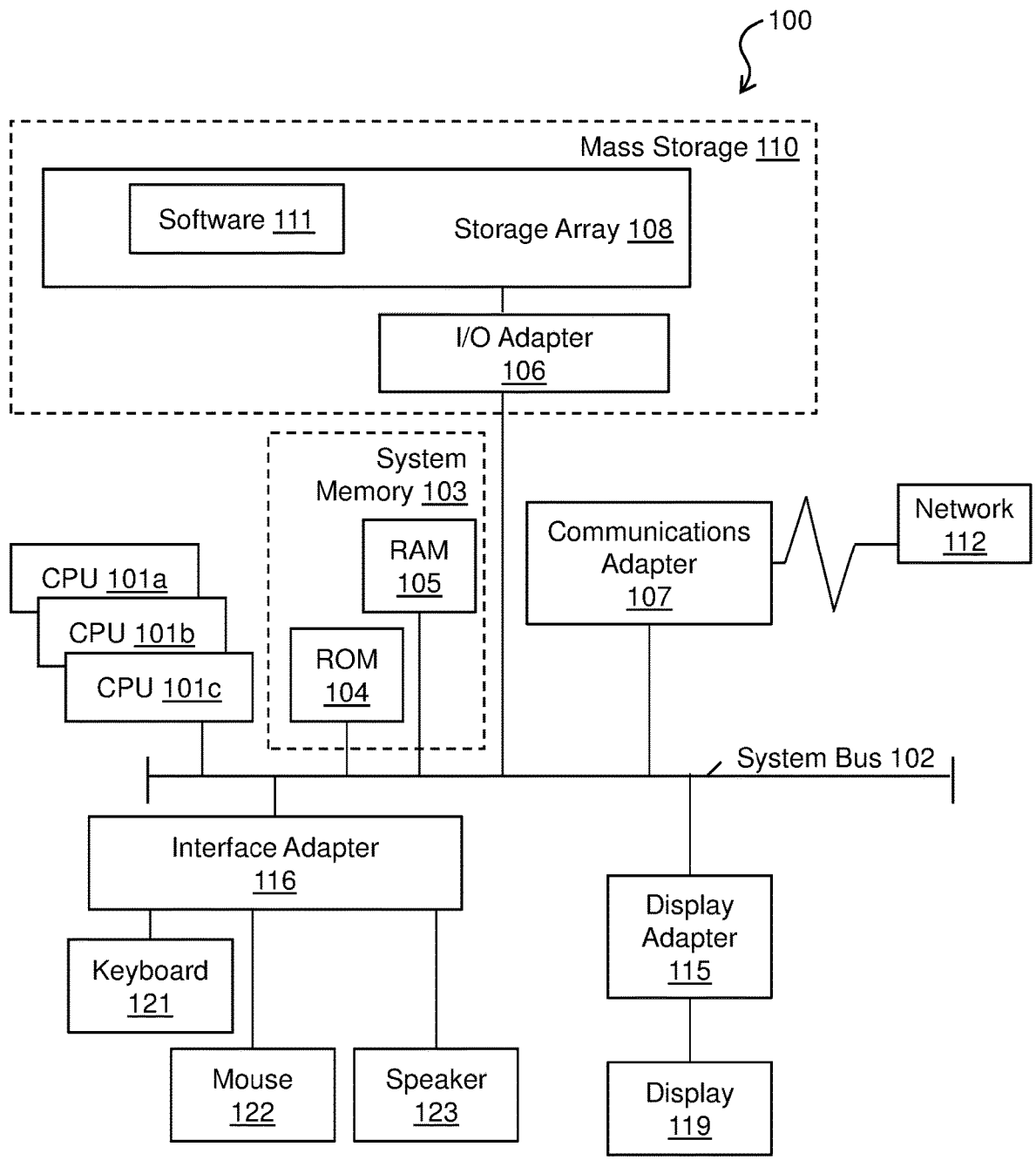
FIG. 1 is a block diagram of an example computer system for encrypted FCIP data replication.

Embodiments of encrypted FCIP data replication are provided, with exemplary embodiments being discussed below in detail. Before replication data is transmitted across a network, the replication data may be encrypted and encapsulated. Encryption and encapsulation of replication data may be performed on the primary host system at a primary host site before transmitting the encrypted and encapsulated replication data over a wide area network (WAN), which may comprise a fiber network, to a secondary site. Performing the encryption and encapsulation together on the primary host system may allow interaction of the encryption and encapsulation engines via, for example, a shared memory, allowing relatively fast processing and improved data security.

Data may be replicated across multiple storage sites using a fibre channel (FC)-4 layer protocol connection, such as fibre channel protocol (FCP) or a fibre connection (FICON) protocol. For relatively long fiber connections (e.g., for storage sites that are geographically far apart), FC frames (e.g., FCP or FICON frames) may be encapsulated into packets according to fibre channel over internet protocol (FCIP) for transport. The FCIP packets may be transmitted via a WAN with other transport control protocol/internet protocol (TCP/IP) traffic. Data that is generated by a primary host system may be encapsulated into FCIP packets by a switching device that is configured to interface with the fiber network; however, such a switching device may be external to the primary host system. Performing the encapsulation on a specialized module, e.g. an application specific integrated circuit (ASIC) that performs both encryption and the encapsulation, that is local to the primary host system may allow application of an encryption scheme to protect the replication data while it is in transit. The encryption may be applied to FC data before encapsulation in some embodiments.

The primary host system may include an FCIP module comprising an application specific integrated circuit (ASIC) that is configured to perform both encryption and encapsulation of replication data. The FCIP module may act as an input/output (I/O) channel card for the primary host system to interface with a fiber network. Replication data may enter the FCIP module via a server connector, be encrypted and encapsulated by the FCIP module, and then be transported on the fiber network to the secondary site. Another FCIP module may receive the replication data from the fiber network at the secondary site, perform de-encapsulation and de-encryption, and then store the replication data on storage volumes that are located at the secondary site. In some embodiments, the encapsulation that is performed by an FCIP module may correspond to the encapsulation that is documented in any of the Institute of Electrical and Electronics Engineers (IEEE) Request for Comments (RFC) 3821, IEEE RFC 3643, and T11 FC-BB-6 standards. In some embodiments, the replication data may be transmitted using a remote direct memory access (RDMA) over Converged Ethernet (RoCE) protocol, so as to allow relatively efficient use of bandwidth. In some embodiments, the persistent information unit (IU) pacing may be implemented to transmit the replication data. The FCIP module may also detect data transmission errors in the received replication data at the secondary site and perform error recovery in some embodiments.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a storage array 108 and/or any other similar component. The I/O adapter 106 and the storage array 108 are collectively referred to herein as a mass storage 110. The I/O adapter 106 may be a small computer systems interface (SCSI), SATA, fibre channel, Ethernet, RDMA over Converged Ethernet (RoCE), Peripheral Component Interconnect Express (PCIe), or Non-volatile Memory Express (NVMe) adapter that communicates with a hard disk, Direct Access Storage Device (DASD), tape drive, storage class memory (SCM), flash memory, and/or any other similar component. The I/O adapter 106 and the storage array 108 are collectively referred to herein as mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), a storage area network (SAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
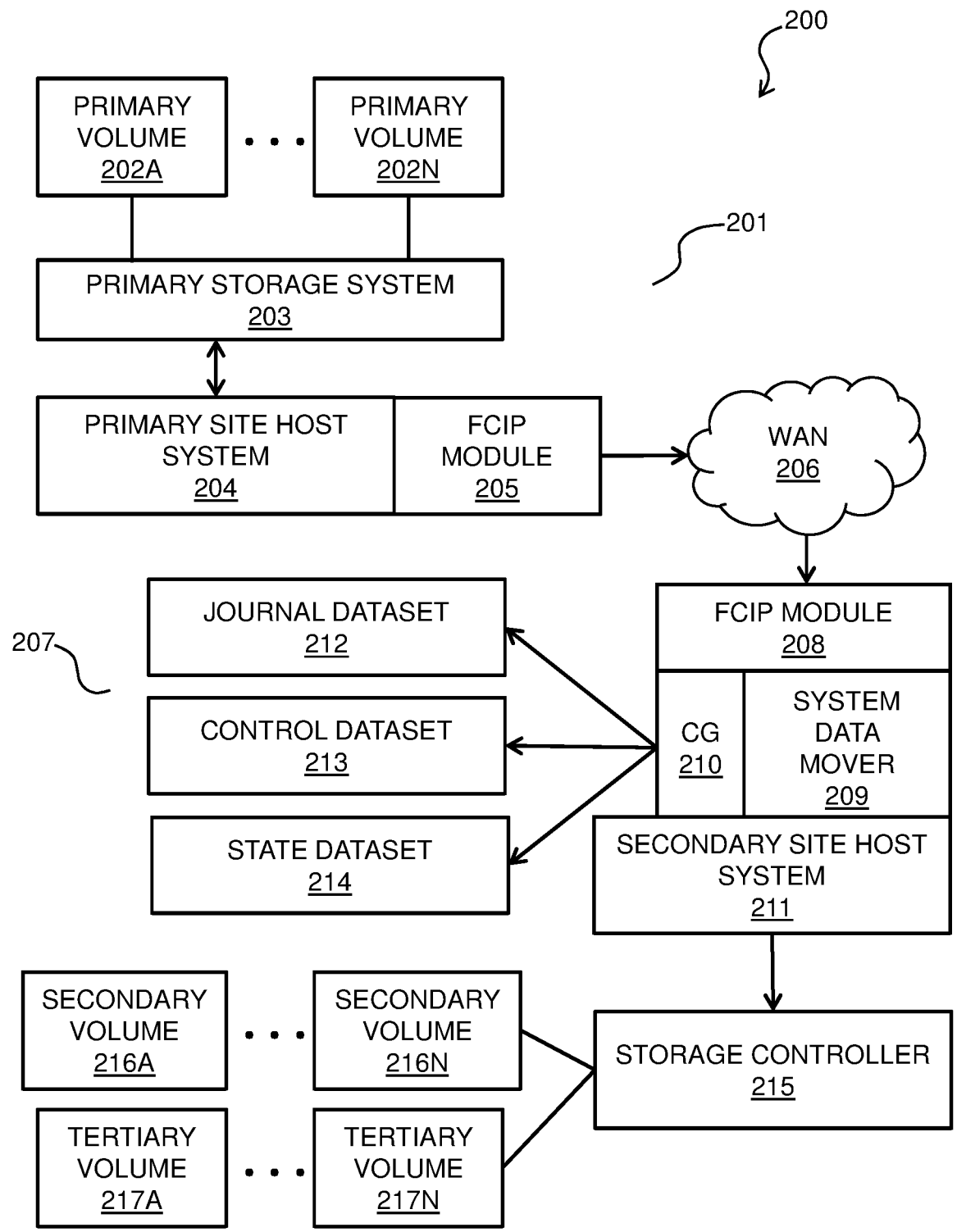
FIG. 2 is a block diagram of an example system for encrypted FCIP data replication.

FIG. 2 is a block diagram of an example system 200 for encrypted FCIP data replication. System 200 may include one or more computer systems such as computer system 100 of FIG. 1. System 200 includes a primary site 201 and a secondary site 207. Data that is stored at primary site 201 is replicated to secondary site 207. The primary site 201 and the secondary site 207 are connected by a WAN 206, which may be a fiber channel network. In some embodiments, the replication data may be transmitted across WAN 206 using a RoCE protocol, so as to allow relatively efficient use of bandwidth. In some embodiments, persistent IU pacing may be implemented to transmit the replication data. The data may be replicated from primary site 201 to secondary site 207 using asynchronous data mirroring in some embodiments.

The primary site 201 includes a plurality of storage volumes, i.e., primary volumes 202A-N. The primary volumes 202A-N may be any appropriate type of computer storage. The primary volumes 202A-N are managed by primary storage system 203, which is in connection with primary site host system 204. The primary site host system 204 includes an FCIP module 205. The FCIP module 205 receives FC frames, which may be, for example, FICON and/or FCP frames, comprising replication data from primary site host system 204, and encrypts and encapsulates the FC frames into FCIP packets for transmission via WAN 206 to the secondary site 207.

Another FCIP module 208 receives the FCIP packets containing the replication data from the WAN 206 at the secondary site 207. The FCIP module 208 de-encapsulates and de-encrypts the replication data for storage at the secondary site 207, i.e., in secondary volumes 216A-N and tertiary volumes 217A-N. Secondary volumes 216A-N and tertiary volumes 217A-N may be any appropriate type of computer storage. In some embodiments, secondary volumes 216A-N and tertiary volumes 217A-N may each store an independent copy of the data that is stored in the primary volumes 202A-N at the primary site 201. A secondary site such as secondary site 207 may include any appropriate number of storage volumes in various embodiments. The FCIP module 208 provides the replication data to system data mover 209 in secondary site host system 211. The system data mover 209 processes the replication data into consistency groups (CGs) 210. The data from the CGs are written into journal dataset 212, control dataset 213, and state dataset 214; these datasets are used to ensure the integrity of the replication data at secondary site 207. The system data mover 209 also causes the replication data to be provided from secondary site host system 211 to storage controller 215. Storage controller 215 writes the replication data into the secondary volumes 216A-N and tertiary volumes 217A-N.

In some embodiments, the primary storage system 203 at primary site 201 may be a DS8K system that writes the replication data into record sets in a cache at the primary site 201. The record sets may be asynchronously offloaded from the cache at primary site 201 to the system data mover 209 at secondary site 207 via a FC connection (e.g., a FICON connection or an FCP connection) over WAN 206. The record sets may be provided via the FC from primary storage system 203 to FCIP module 205. The FCIP module 205 encrypts and/or encapsulates the FC frames that contain the record sets into FCIP packets. The FCIP packets may be transmitted using shared memory communications (SMC) via a RoCE link across the WAN 206. The FCIP packets that hold the record sets enter the secondary site 207 from WAN 206 via FCIP module 208, which performs de-encapsulation and de-encryption of the FCIP packets. The received record sets are written into storage buffers of the system data mover 209. The received record sets are then processed into CGs 210 by the system data mover 209. A CG contains records that have their order of update preserved across multiple logical control units (LCUs) in the DS8K system that comprises primary storage system 203 at the primary site 201. Creation of CGs may ensure that data is mirrored to the secondary site 207 with point in time, cross-volume consistent integrity. Once a CG is formed, it is written from storage buffers of the system data mover 209 to the journal dataset 212. The received record sets are written from the storage buffers of the system data mover 209 to the auxiliary storage volumes (e.g., secondary volumes 216A-N and/or tertiary storage volumes 217A-N). The control dataset 213 is then updated to reflect that the record sets in the CG have been written to the auxiliary volumes, and to reflect the consistency time of the volume group. Operation of system 200 of FIG. 2 is discussed in further detail below with respect to FIG. 4. FCIP module 205 of FIG. 2 is discussed in further detail below with respect to FIG. 3 and FIG. 5. FCIP module 208 of FIG. 2 is discussed in further detail below with respect to FIG. 3 and FIG. 6.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional storage volumes, host systems, networks, datasets, storage controllers, etc.). Further, a primary site such as primary site 201 may be in communication with any appropriate number of secondary sites such as secondary site 207 via any appropriate network. Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
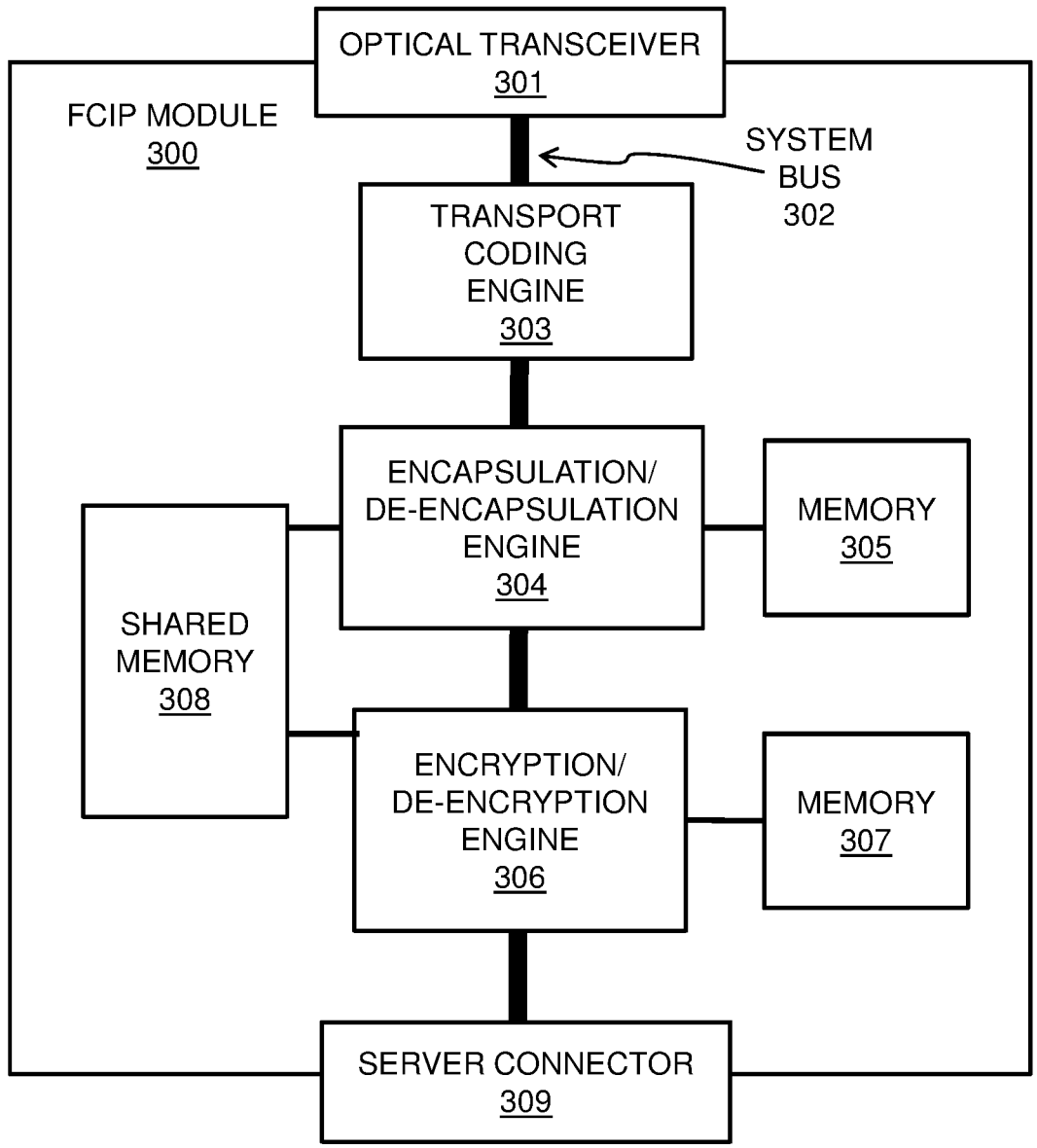
FIG. 3 is a block diagram of an example encrypted FCIP module for encrypted FCIP data replication.

FIG. 3 is a block diagram of an example FCIP module 300 for encrypted FCIP data replication. FCIP module 300 may comprise any of FCIP module 205 and/or FCIP module 208 of system 200 of FIG. 2. FCIP module 300 includes an optical transceiver 301 for interfacing with, for example, a WAN such as WAN 206 of FIG. 2. The optical transceiver 301 is connected to a system bus 302. The system bus 302 connects a transport coding engine 303, encapsulation/de-encapsulation engine 304, encryption/de-encryption engine 306, and server connector 309. The server connector 309 may interface with a host system, such as primary site host system 204 or secondary site host system 211 of FIG. 2. The encapsulation/de-encapsulation engine 304 is in communication with a dedicated local memory 305 for use in the encapsulation/de-encapsulation process. In some embodiments, the encapsulation/de-encapsulation engine 304 may perform the encapsulation and de-encapsulation according to any of the IEEE RFC 3821, IEEE RFC 3643, and T11 FC-BB-6 standards. The encryption/de-encryption engine 306 is in communication with a dedicated local memory 307 for use in the encryption/de-encryption process. The encryption/de-encryption engine 306 may implement any appropriate encryption scheme. The encapsulation/de-encapsulation engine 304 and the encryption/de-encryption engine 306 are both in communication with a shared memory 308, which is a local memory to the FCIP module 300. The shared memory 308 allows the encapsulation/de-encapsulation engine 304 and the encryption/de-encryption engine 306 to share information such as unencrypted frame headers. The operation of FCIP module 300 is discussed in further detail below with respect to method 500 of FIG. 5 and method 600 of FIG. 6.

It is to be understood that the block diagram of FIG. 3 is not intended to indicate that the FCIP module 300 is to include all of the components shown in FIG. 3. Rather, the system 200 can include any appropriate fewer or additional components not illustrated in FIG. 3 (e.g., additional transceivers, interfaces, memories, engines, system buses, etc.). Further, the embodiments described herein with respect to FCIP module 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
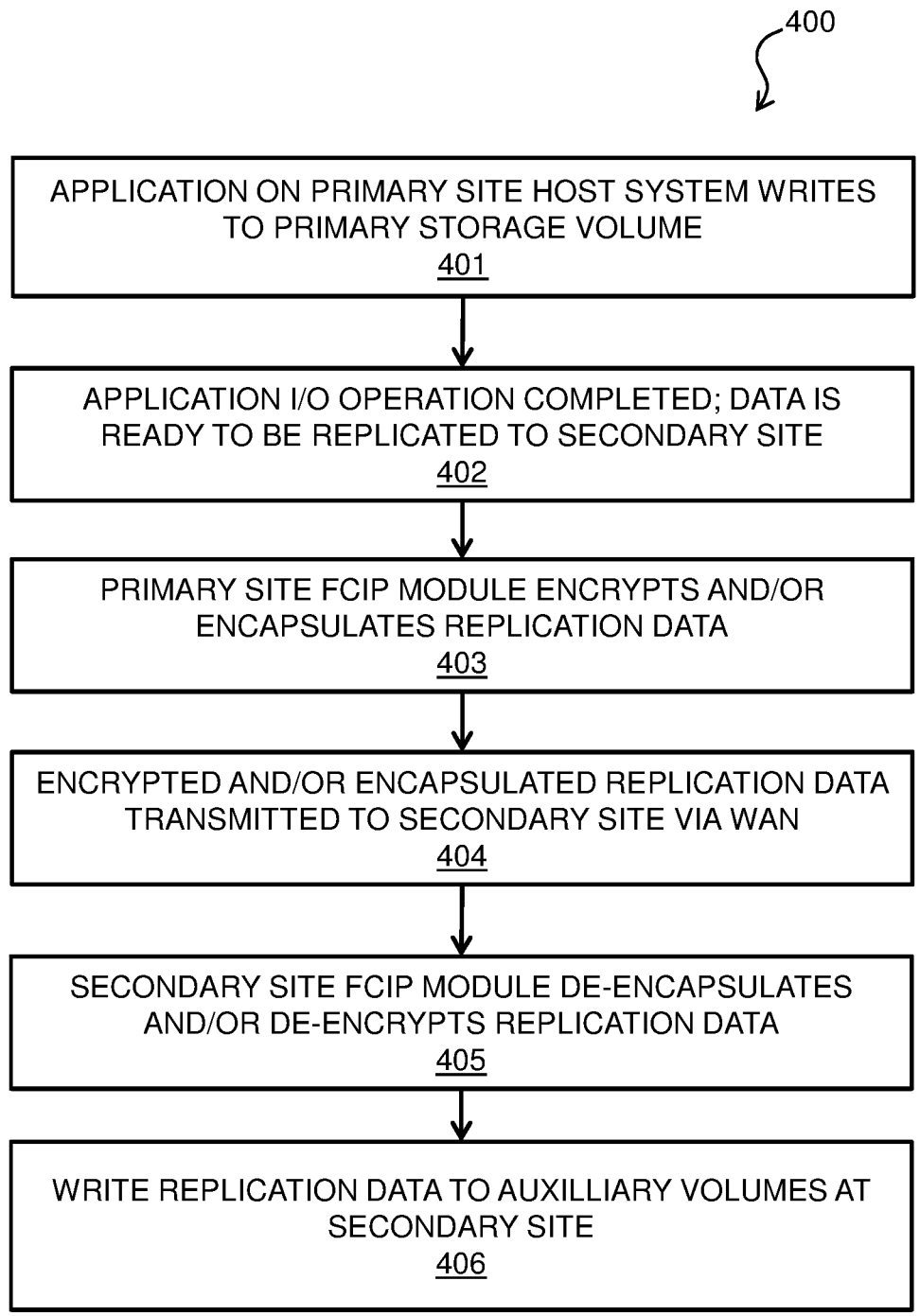
FIG. 4 is a process flow diagram of an example method for encrypted FCIP data replication.

FIG. 4 is a process flow diagram of an example method 400 for encrypted FCIP data replication. The method 400 can be implemented with any suitable computing device, such as the computer system 100 of FIG. 1, and is discussed with reference to system 200 of FIG. 2. In block 401 of method 400, an application running on primary site host system 204 performs an I/O operation comprising writing data to primary volumes 202A-N via primary storage system 203. In block 402, when the I/O operation to primary volumes 202A-N completes, the written data is determined to be ready for replication to a secondary site 207. The primary site host system 204 provides the replication data to FCIP module 205 in block 402. The replication data may be provided to the FCIP module 205 as FC frames, which may be, for example, FCP frames or FICON frames, having associated time stamps in some embodiments of block 402. In block 403, the FCIP module 205 encrypts and/or encapsulates the replication data for transmission over WAN 206 to secondary site 207. In some embodiments, the FCIP module 205 may output FCIP packets containing encrypted FC frame data to the WAN 206. The operation of FCIP module 205 in block 403 is discussed in further detail below with respect to method 500 of FIG. 5.

Next, in block 404, the encrypted and/or encapsulated replication data that was generated by the FCIP module in block 403 is transmitted onto WAN 206, and is received by FCIP module 208 at the secondary site 207 from WAN 206. In block 405, the FCIP module 208 de-encapsulates and de-encrypts the received replication data, which may comprise FCIP packets containing encrypted FC frame data in some embodiments. The operation of FCIP module 208 in block 405 is discussed in further detail below with respect to method 600 of FIG. 6. In block 406, the de-encapsulated and de-encrypted replication data (e.g., FC frames and associated time stamps) is provided to the system data mover 209 of the secondary site host system 211 for storage on any auxiliary volumes (e.g., secondary volumes 216A-N and tertiary volumes 217A-N) in the secondary site 207 via storage controller 215. CGs 210 are generated by system data mover 209 based on the replication data, and control data, such as journal dataset 212, control dataset 213, and state dataset 214, are updated by system data mover 209 to ensure the integrity of the replication data.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
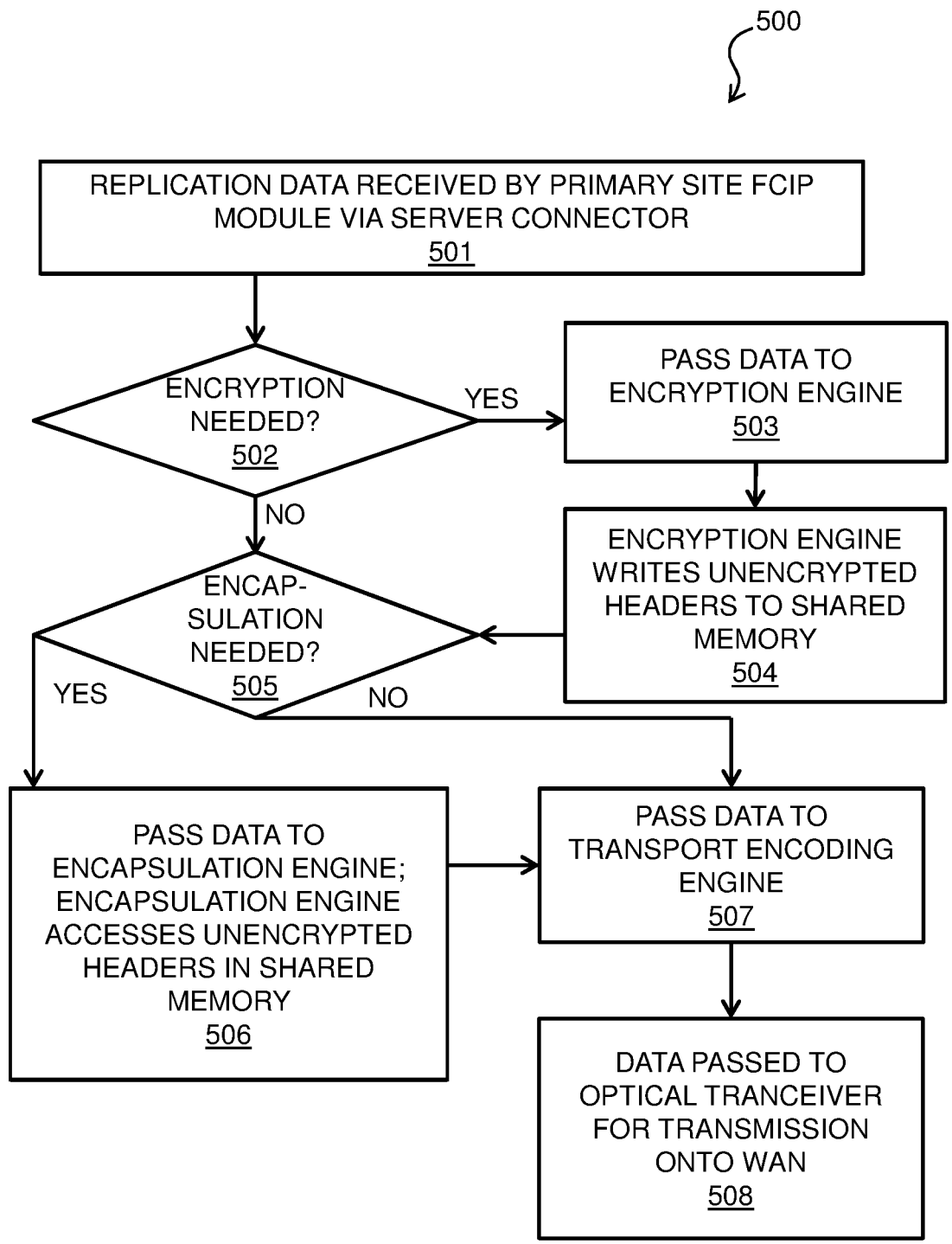
FIG. 5 is a process flow diagram of an example method for sending replication data for encrypted FCIP data replication.

FIG. 5 is a process flow diagram of an example method 500 for sending data for encrypted FCIP data replication. The method 500 can be implemented with any suitable computing device, such as the computer system 100 of FIG. 1, and is discussed with reference to FCIP module 205 of FIG. 2, and FCIP module 300 of FIG. 3. Method 500 of FIG. 5 may be performed in block 403 of method 400 of FIG. 4. In block 501 of method 500 of FIG. 5, replication data from a primary site 201 that is to be replicated to a secondary site 207 is received by an FCIP module 205/300 from primary site host system 204 via server connector 309. The replication data may be received by the FCIP module 205/300 in a FC frame format that includes an associated time stamp. In various embodiments, the FC frames may be FCP frames and/or FICON frames. In block 502, it is determined whether encryption of the replication data is needed. In some embodiments, it may be determined by the organization that owns the data whether encryption is needed based on, for example, business requirements, policies and/or government regulations that apply to the organization. Whether to perform encryption of particular organization's data may be configured by, for example, an administrator of the primary site 201. If it is determined in block 502 that encryption of the replication data is needed, flow proceeds from block 502 to block 503, in which the replication data is passed via system bus 302 to encryption/de-encryption engine 306. The encryption/de-encryption engine 306 may encrypt the replication data according to any appropriate encryption scheme in block 503 using memory 307. In block 504, header information, which may include unencrypted header information from the FC frames that were received by the FCIP module 205/300 in block 501, are written into shared memory 308 by the encryption/de-encryption engine 306. Flow then proceeds from block 504 to block 505. If it was determined in block 502 that encryption of the replication data is not needed, flow proceeds from block 502 to block 505.

In block 505, it is determined whether encapsulation of the replication data is needed. Whether encapsulation is needed is dependent on the type of network over which the replication data will be transmitted to the secondary site. For example, if the replication data is going to be transmitted a TCP/IP based network, the replication data needs to be encapsulated. If it is determined in block 505 that encapsulation of the replication data is needed, flow proceeds from block 505 to block 506. In block 506, the replication data is passed via the system bus 302 to encapsulation/de-encapsulation engine 304. The encapsulation/de-encapsulation engine 304 may encapsulate the replication data (e.g., encrypted FC frames and associated time stamps) for transport according to any appropriate encapsulation scheme in block 506 using memory 305. In some embodiments, the encapsulation/de-encapsulation engine 304 may perform the encapsulation in block 504 according to any of the IEEE RFC 3821, IEEE RFC 3643, and T11 FC-BB-6 standards. The encapsulation/de-encapsulation engine 304 may make use of the unencrypted FC frame header information that was written into the shared memory 308 by the encryption/de-encryption engine 306 in block 504 during the encapsulation of block 506. The encapsulation/de-encapsulation engine 304 may output FCIP packets in some embodiments. Flow then proceeds from block 506 to block 507. If it was determined in block 505 that encapsulation of the replication data is not needed, flow proceeds from block 505 to block 507.

In block 507, the replication data is passed via system bus 302 to the transport encoding engine 303. The transport encoding engine 303 encodes the replication data for transmission on the WAN 206. Then, in block 508, the replication data is passed to the optical transceiver 301 via the system bus 302, and the optical transceiver 301 puts the replication data, which may comprise FCIP packets containing encrypted FC frame data, onto the WAN 206 for transmission to the secondary site 207.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
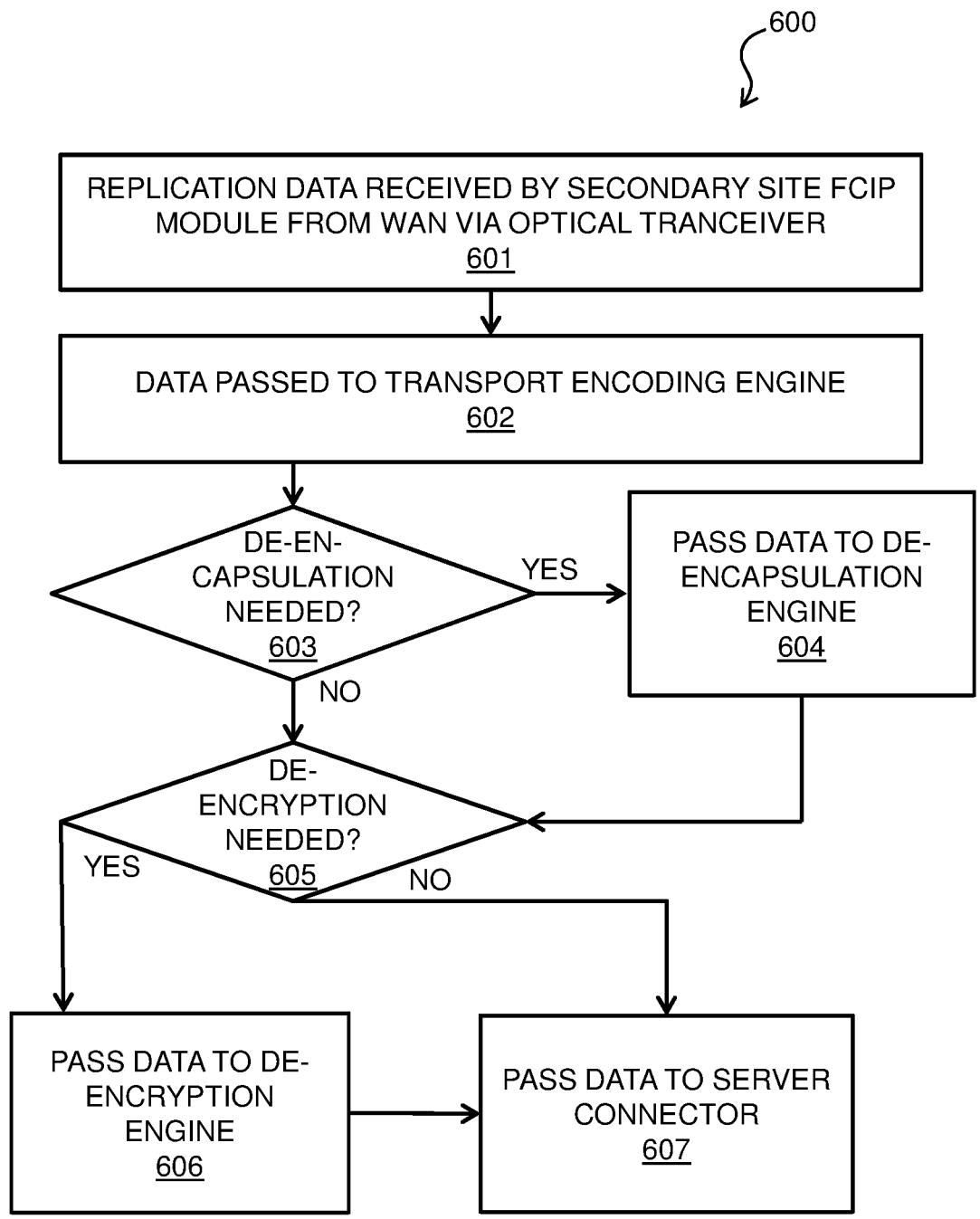
FIG. 6 is a process flow diagram of an example method for receiving replication data for encrypted FCIP data replication.

FIG. 6 is a process flow diagram of an example method 600 for receiving data for encrypted FCIP data replication. The method 600 can be implemented with any suitable computing device, such as the computer system 100 of FIG. 1, and is discussed with reference to FCIP module 208 of FIG. 2, and FCIP module 300 of FIG. 3. Method 600 of FIG. 6 may be performed in block 405 of method 400 of FIG. 4. In block 601 of method 600 of FIG. 6, replication data is received from WAN 206 by optical transceiver 301 in the FCIP module 208/300. The replication data that is received in block 601 may be in FCIP packets. In block 602, the replication data is passed via system bus 302 from the optical transceiver 301 to the transport encoding engine 303. The transport encoding engine 303 de-encodes the received replication data in block 602.

In block 603, it is determined whether de-encapsulation of the replication data is needed. This determination may be made based on the format of the received data (i.e., whether the received data is encapsulated). If it is determined in block 603 that de-encapsulation of the replication data is needed, flow proceeds from block 603 to block 604. In block 604, the replication data is passed via the system bus 302 to encapsulation/de-encapsulation engine 304. The encapsulation/de-encapsulation engine 304 may de-encapsulate the replication data, which may comprise FCIP packets, according to any appropriate encapsulation scheme in block 506 using memory 305. In some embodiments, the encapsulation/de-encapsulation engine 304 may perform the de-encapsulation in block 604 according to any of the IEEE RFC 3821, IEEE RFC 3643, and T11 FC-BB-6 standards. The encapsulation/de-encapsulation engine 304 may validate the byte stream in block 604, and de-encapsulate FC frames and associated time stamps that are included in the FCIP packets. Flow then proceeds from block 604 to block 605. If it was determined in block 603 that de-encapsulation of the replication data is not needed, flow proceeds from block 603 to block 605.

In block 605, it is determined whether de-encryption of the replication data is needed. This determination may be made based on the format of the received data (i.e., whether the received data is encrypted). In some embodiments, the replication data may be stored in an encrypted format at the secondary site 207; in such embodiments, de-encryption is not needed in block 605. Whether to perform de-encryption of particular organization's data may be configured by, for example, an administrator of the secondary site 207. If it is determined in block 605 that de-encryption of the replication data is needed, flow proceeds from block 605 to block 606, in which the replication data is passed via system bus 302 to encryption/de-encryption engine 306. The encryption/de-encryption engine 306 may de-encrypt the replication data according to any appropriate encryption scheme in block 606 using memory 307. The de-encryption scheme implemented in block 606 may correspond to the encryption scheme used in block 503 of method 500 of FIG. 5. Flow then proceeds from block 606 to block 607. If it was determined in block 605 that de-encryption of the replication data is not needed, flow proceeds from block 605 to block 607. In block 607, the replication data, which may comprise unencrypted FC frames and associated time stamps, are passed to the system data mover 209 of secondary site host system 211 via system bus 302 and server connector 309.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising logic configured to:
   receive replication data from a primary site host system, the replication data comprising header information, wherein the replication data that is received from the primary site host system comprises fibre channel (FC) frames and associated time stamps;
   encrypt the replication data;
   write the header information to a local memory, wherein the header information in the local memory is unencrypted, and wherein the unencrypted header information comprises unencrypted FC frame header information; and
   encapsulate the encrypted replication data, wherein the unencrypted header information is accessed in the local memory during the encapsulation of the encrypted replication data, wherein the encapsulated and encrypted replication data comprises fibre channel over internet protocol (FCIP) packets.

2. The system of claim 1, wherein the FC frames comprise fibre channel protocol (FCP) frames; and
   wherein the unencrypted header information comprises unencrypted FCP frame header information.

3. The system of claim 1, wherein the FC frames comprise fibre connection (FICON) frames; and wherein the unencrypted header information comprises unencrypted FICON frame header information.

4. The system of claim 1, configured to:
transmit the encapsulated and encrypted replication data on a wide area network (WAN).

5. The system of claim 4, wherein the logic comprises a first application specific integrated circuit (ASIC), comprising:
a first server connector configured to interface with the primary site host system;
an encryption engine configured to encrypt the replication data and write the header information to the local memory;
the local memory;
an encapsulation engine configured to encapsulate the encrypted replication data and access the unencrypted header data in the local memory; and
a first optical transceiver configured to interface with the WAN, wherein the WAN comprises a fiber network.

6. The system of claim 5, wherein the first ASIC is in communication with a second ASIC via the WAN, the second ASIC comprising:
a second optical transceiver configured to interface with the WAN to receive the encapsulated encrypted replication data;
a de-encapsulation engine configured to de-encapsulate the encapsulated encrypted replication data;
a de-encryption engine configured to de-encrypt the encrypted replication data; and
a second server connector configured to interface with a secondary site host system;
wherein the replication data is stored in a primary volume associated with the first ASIC, and a copy of the replication data is stored in a secondary volume associated with the second ASIC.

7. A computer-implemented method, comprising:
receiving replication data from a primary site host system, the replication data comprising header information, wherein the replication data that is received from the primary site host system comprises fibre channel (FC) frames and associated time stamps;
encrypting the replication data;
writing the header information to a local memory, wherein the header information in the local memory is unencrypted, and wherein the unencrypted header information comprises unencrypted FC frame header information; and
encapsulating the encrypted replication data, wherein the unencrypted header information is accessed in the local memory during the encapsulation of the encrypted replication data, wherein the encapsulated and encrypted replication data comprises fibre channel over internet protocol (FCIP) packets.

8. The computer-implemented method of claim 7, wherein the FC frames comprise fibre channel protocol (FCP) frames;
and wherein the unencrypted header information comprises unencrypted FCP frame header information.

9. The computer-implemented method of claim 7, wherein the FC frames comprise fibre connection (FICON) frames; and
wherein the unencrypted header information comprises unencrypted FICON frame header information.

10. The computer-implemented method of claim 7, further comprising:
transmitting the encapsulated and encrypted replication data on a wide area network (WAN).

11. The computer-implemented method of claim 10, comprising a first application specific integrated circuit (ASIC), comprising:
a first server connector configured to interface with the primary site host system;
an encryption engine configured to encrypt the replication data and write the header information to the local memory;
the local memory;
an encapsulation engine configured to encapsulate the encrypted replication data and access the unencrypted header data in the local memory; and
a first optical transceiver configured to interface with the WAN, wherein the WAN comprises a fiber network.

12. The computer-implemented method of claim 11, wherein the first ASIC is in communication with a second ASIC via the WAN, the second ASIC comprising:
a second optical transceiver configured to interface with the WAN to receive the encapsulated encrypted replication data;
a de-encapsulation engine configured to de-encapsulate the encapsulated encrypted replication data;
a de-encryption engine configured to de-encrypt the encrypted replication data; and
a second server connector configured to interface with a secondary site host system;
wherein the replication data is stored in a primary volume associated with the first ASIC, and a copy of the replication data is stored in a secondary volume associated with the second ASIC.

13. A computer program product comprising a computer readable storage medium having program instructions embodied therewith, the program instructions executable by one or more processors to cause the one or more processors to perform operations comprising:
receiving replication data from a primary site host system, the replication data comprising header information, wherein the replication data that is received from the primary site host system comprises fibre channel (FC) frames and associated time stamps;
encrypting the replication data;
writing the header information to a local memory, wherein the header information in the local memory is unencrypted, and wherein the unencrypted header information comprises unencrypted FC frame header information; and
encapsulating the encrypted replication data, wherein the unencrypted header information is accessed in the local memory during the encapsulation of the encrypted replication data, wherein the encapsulated and encrypted replication data comprises fibre channel over internet protocol (FCIP) packets.

14. The computer program product of claim 13, wherein the FC frames comprise fibre channel protocol (FCP) frames; and
wherein the unencrypted header information comprises unencrypted FCP frame header information.

15. The computer program product of claim 13, wherein the FC frames comprise fibre connection (FICON) frames; and
wherein the unencrypted header information comprises unencrypted FICON frame header information.

16. The computer program product of claim 13, wherein the operations further comprise:
transmitting the encapsulated and encrypted replication data on a wide area network (WAN).

17. The computer program product of claim 16, comprising a first application specific integrated circuit (ASIC), comprising:
- a first server connector configured to interface with the primary site host system;
- an encryption engine configured to encrypt the replication data and write the header information to the local memory;
- the local memory;
- an encapsulation engine configured to encapsulate the encrypted replication data and access the unencrypted header data in the local memory; and
- a first optical transceiver configured to interface with the WAN, wherein the WAN comprises a fiber network.

\* \* \* \* \*